United States Patent
Nakata (10) Patent No.: US 8,050,211 B2
(45) Date of Patent: Nov. 1, 2011

(54) COMMUNICATION SYSTEM, BASE STATION APPARATUS, SERVER APPARATUS, MOBILE STATION APPARATUS, AND TRANSMISSION DATA AMOUNT DETERMINING METHOD

(75) Inventor: Koji Nakata, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1792 days.

(21) Appl. No.: 11/236,154

(22) Filed: Sep. 26, 2005

(65) Prior Publication Data
US 2006/0067291 A1 Mar. 30, 2006

(30) Foreign Application Priority Data

Sep. 28, 2004 (JP) ................................. 2004-281927
Jun. 29, 2005 (JP) ................................. 2005-190639

(51) Int. Cl.
*H04B 7/14* (2006.01)
(52) U.S. Cl. ............ 370/315; 370/492; 455/7; 455/13.1
(58) Field of Classification Search .................. None
See application file for complete search history.

(56) References Cited

U.S. PATENT DOCUMENTS

| | | | | |
|---|---|---|---|---|
| 5,692,130 | A * | 11/1997 | Shobu et al. ................... | 709/229 |
| 6,272,145 | B1 * | 8/2001 | Malkin ........................... | 370/432 |
| 7,076,519 | B1 * | 7/2006 | Satou ............................. | 709/203 |
| 7,433,965 | B2 | 10/2008 | Kawai et al. | |
| 2002/0037719 | A1 * | 3/2002 | Ariga et al. ................... | 455/423 |
| 2003/0169716 | A1 * | 9/2003 | Saito .............................. | 370/338 |
| 2003/0174733 | A1 | 9/2003 | Kawai et al. | |
| 2004/0131021 | A1 | 7/2004 | Kanemoto et al. | |
| 2004/0156345 | A1 * | 8/2004 | Steer et al. .................... | 370/338 |
| 2005/0014464 | A1 * | 1/2005 | Larsson ........................ | 455/11.1 |
| 2005/0063355 | A1 * | 3/2005 | Iwamura ....................... | 370/351 |
| 2005/0068911 | A1 * | 3/2005 | Miyake et al. ................ | 370/299 |
| 2007/0060050 | A1 * | 3/2007 | Lee et al. ...................... | 455/13.1 |

FOREIGN PATENT DOCUMENTS

JP     2000076597 A     3/2000
(Continued)

OTHER PUBLICATIONS

Japanese language office action dated Oct. 5, 2010 and its partial English translation for corresponding Japanese application 2005190639 lists the references above.

(Continued)

*Primary Examiner* — Lester Kincaid
*Assistant Examiner* — Isaak R Jama
(74) *Attorney, Agent, or Firm* — DLA Piper LLP (US)

(57) ABSTRACT

It is advantageous for present invention to suitably determine amounts of transmission data for links in a multilink communication. In a mobile communication system (10) for making a multilink communication through which a communication is performed by using a plurality of links relayed by a plurality of base station apparatus (30), respectively, each of the base station apparatuses (30) acquire transmittable data amount information representing amounts of data able to be transmitted through the respective links by a mobile station apparatus (20) or a server apparatus (40), and the mobile station apparatus (20) or the server apparatus (40) determines amounts of transmission data to be transmitted to the respective links in correspondence to the transmittable data amount information, and transmits communication data of amounts of data corresponding to the amounts of transmission data determined to the respective links.

5 Claims, 7 Drawing Sheets

FOREIGN PATENT DOCUMENTS

| | | |
|---|---|---|
| JP | 2000216815 A | 8/2000 |
| JP | 2000316013 A | 11/2000 |
| JP | 2002-094595 | 3/2002 |
| JP | 2002074591 A | 3/2002 |
| JP | 2003244063 A | 8/2003 |
| JP | 2003273916 A | 9/2003 |

OTHER PUBLICATIONS

Japanese language application dated Jun. 29, 2010 and its partial English translation for corresponding Japanese application 2005190639 lists the references above.

* cited by examiner

COMMUNICATION SYSTEM, BASE STATION APPARATUS, SERVER APPARATUS, MOBILE STATION APPARATUS, AND TRANSMISSION DATA AMOUNT DETERMINING METHOD

BACKGROUND OF THE INVENTION

The present invention relates to a communication system, base station apparatus, a server apparatus, a mobile station apparatus, and a transmission data amount determining method.

In multilink communication through which communication is performed by simultaneously using a plurality of links (refer to Patent document 1 for example), a communication apparatus needs to allocate data to be transmitted to each link. Heretofore, the communication apparatus for making the multilink communication has monitored amounts of data received through the respective links (amounts of received data), and has determined amounts of data to be transmitted through the respective links (amounts of transmission data) in correspondence to the amounts of received data. Thus, the communication apparatus allocates the transmission data to the respective links based on the amounts of transmission data thus determined.

[Patent Document 1] JP 2002-94595 A

However, there is a difference between the reception communication environment and the transmission communication environment in many cases. In the above-mentioned conventional method, the communication apparatus has determined the amount of transmission data in correspondence to the amounts of received data even in such cases. Hence, in a multilink communication system having a radio section, a difference has been caused between the amount of transmission data which the communication apparatus has determined and an amount of transmittable data due to an influence of an error rate or a data rate in the radio section in some cases. As a result, delay or retransmission of the data to be transmitted is caused. Thus, communication ceases as the case may be.

SUMMARY OF THE INVENTION

In the light of the foregoing, it is, therefore, one of objects of the present invention to provide a communication system, base station apparatus, a server apparatus, a mobile station apparatus, and a transmission data amount determining method which enable amounts of transmission data for respective links to be suitably determined in a multilink communication.

In order to attain the above-mentioned object, according to an aspect of the present invention, there is provided a communication system for making a multilink communication through which a communication is performed by using a plurality of links, the communication system including: transmittable data amount information acquiring means for acquiring transmittable data amount information representing amounts of data able to be transmitted through each of the links; transmission data amount determining means for determining amounts of transmission data to be transmitted to each of the links, in correspondence to the transmittable data amount information; and communication data transmitting means for transmitting communication data of amounts of transmission data corresponding to the determined amounts of transmission data to each of the links.

By adopting this constitution, the communication system can determine the amounts of transmission data for each of the links in correspondence to the amounts of transmittable data for each of the links constituting the multilink. That is, it becomes possible to suitably determine the amounts of transmission data for each of the links.

In addition, preferably, in the communication system, plurality of the communications are made in the communication system, and the transmittable data amount information acquiring means acquires the transmittable data amount information for each communication.

In this case, even when the plurality of communications are made, the amounts of transmission data for each of the links can be suitably determined every communication.

According to another aspect of the present invention, there is provided a communication system for making a multilink communication through which a communication apparatus makes a communication by using a plurality of links, in which each of said links is a link through which data is relayed by each of a plurality of relay communication apparatuses, each of the relay communication apparatuses includes: transmittable data amount information acquiring means for acquiring transmittable data amount information representing an amount of data which said communication apparatus is able to transmit through the link relayed by the relay communication apparatus; and transmittable data amount information transmitting means for transmitting the transmittable data amount information to the communication apparatus, and the communication apparatus includes: transmittable data amount information receiving means for receiving the transmittable data amount information transmitted thereto; and communication data transmitting means for transmitting communication data of amounts of transmission data corresponding to amounts of transmittable data represented by the transmittable data amount information to each of the links.

By adopting this constitution, the communication system can determine the amounts of transmission data for each of the links in correspondence to the amounts of transmittable data which is transmitted from the relay communication apparatuses of the respective links constituting the multilink. That is, the amounts of transmission data for the respective links can be suitably determined in the multilink communication.

In addition, preferably, in the communication system according to the another aspect of the present invention, the communication system includes a mobile communication system, the communication apparatus communicates with a mobile station apparatus included in the mobile communication system by using the plurality of links, the relay communication apparatus is base station apparatus included in the mobile communication system, and the transmittable data amount information is information representing amounts of data which can be transmitted from the base station apparatus to the mobile station apparatus.

In this case, the communication system can determine the amount of data to be transmitted from the communication apparatus in correspondence to the amount of data which can be transmitted from the base station apparatus to the mobile station apparatus every link.

In addition, preferably, in the communication system according to the another aspect of the present invention, the transmittable data amount information may be determined in correspondence to the number of communications in a radio section of the base station apparatus, the transmittable data amount information may be determined in correspondence to an error rate in a radio section of the base station apparatus, or the transmittable data amount information may be determined in correspondence with a data rate in a radio section of the base station apparatus.

Also, preferably, in the communication system according to the another aspect of the present invention, the communication apparatus communicates with a plurality of mobile station apparatuses while using a plurality of links with respect to each of the mobile station apparatuses, the transmittable data amount information receiving means receives transmittable data amount information from each of base station apparatuses, respectively, every mobile station apparatus, with respect to each of the links used for the communication with the corresponding mobile station apparatus, the communication data transmitting means includes rate calculating means for calculating rates of amounts of transmittable data for each of the links based on transmittable data amount information received with respect to the each of links every mobile station apparatus, and the communication data transmitting means transmits the communication data to each of the links in correspondence to the rates calculated by the rate calculating means, thereby transmitting communication data of amounts of transmission data corresponding to amounts of transmittable data represented by the transmittable data amount information to the links, respectively.

Moreover, preferably, in the communication system according to the another aspect of the present invention, the communication system includes a mobile communication system, the communication apparatus is a mobile station apparatus included in the mobile communication system, and the relay communication apparatus is base station apparatus included in the mobile communication system.

In those cases, the communication system can determine the amount of data to be transmitted from the mobile station apparatus in correspondence to the amount of data, which the mobile station apparatus can transmit to the base station apparatus, every link.

According to still another aspect of the present invention, there is provided base station apparatus for use in a mobile communication system in which a mobile station apparatus communicates with a server apparatus by using a plurality of links relayed by a plurality of base station apparatus, respectively, the base station apparatus including: transmittable data amount information acquiring means for acquiring transmittable data amount information representing an amount of data able to be transmitted through the link relayed by the base station apparatus from the base station apparatus to the mobile station apparatus; and transmittable data amount information transmitting means for transmitting the transmittable data amount information to the server apparatus or the mobile station apparatus.

According to yet another aspect of the present invention, there is provided a server apparatus for use in a mobile communication system in which a mobile station apparatus communicates with a server apparatus by using a plurality of links relayed by a plurality of base station apparatus, respectively, the server apparatus including: transmittable data amount information acquiring means for acquiring transmittable data amount information representing amounts of data able to be transmitted from each of the base station apparatuses to the mobile station apparatus; and communication data transmitting means for transmitting communication data of amounts of transmission data corresponding to amounts of transmittable data represented by the transmittable data amount information to each of links.

According to a further aspect of the present invention, there is provided a mobile station apparatus for making a communication by using at least one of a plurality of links relayed by a plurality of base station apparatus, respectively, in a mobile communication system including the plurality of base station apparatus, the mobile station apparatus including: transmittable data amount information acquiring means for acquiring transmittable data amount information representing amounts of data which the mobile station apparatus is able to transmit through the links relayed by each of the base station apparatuses; and communication data transmitting means for transmitting communication data of amounts of transmission data corresponding to amounts of transmittable data represented by the transmittable data amount information to each of links.

According to an even further aspect of the present invention, there is provided a transmission data amount determining method of determining an amount of transmission data for each link in a communication system for making a multilink communication through which a communication is performed by using a plurality of links, the transmission data amount determining method including: a transmittable data amount information acquisition step of acquiring transmittable data amount information representing amounts of data able to be transmitted through each of the links; a transmission data amount determination step of determining amounts of transmission data to be transmitted to each of the links, respectively, in correspondence to the transmittable data amount information; and a data transmission step of transmitting transmission data of amounts of transmission data corresponding to the determined amounts of transmission data to each of the links.

DESCRIPTION OF THE PREFERRED
EMBODIMENT(S)

The preferred embodiments of the present invention will hereinafter be described in detail with reference to the accompanying drawings.

Figure 1:
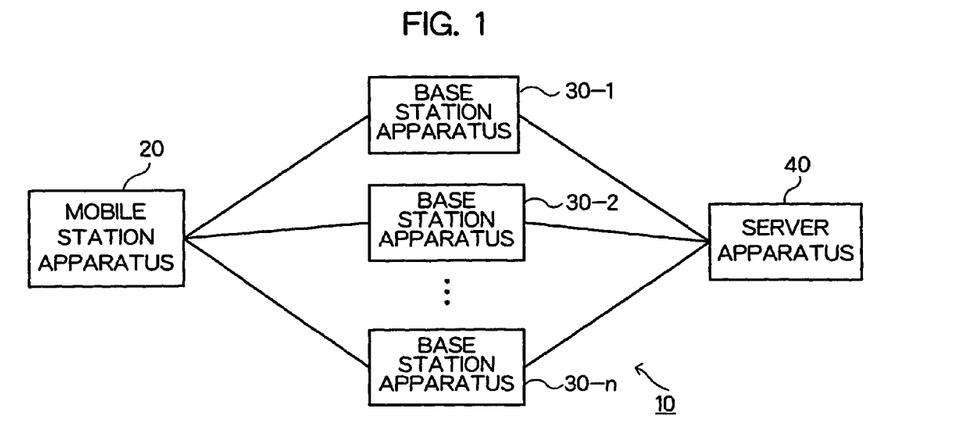
FIG. 1 is a block diagram showing a construction of a mobile communication system according to an embodiment of the present invention.

A mobile communication system 10 according to an embodiment of the present invention, as shown in FIG. 1, includes a mobile station apparatus 20, a plurality of base station apparatus 30, and a server apparatus 40. The mobile station apparatus 20 and the server apparatus 40 are connected to each of base station apparatuses 30 through communication paths (links).

Figure 2:
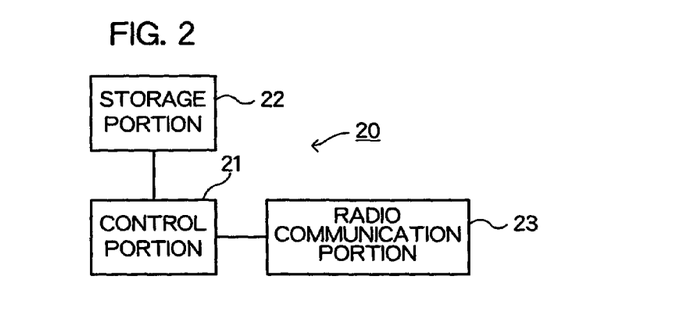
FIG. 2 is a block diagram showing a configuration of a mobile station apparatus according to the embodiment of the present invention.

A mobile station apparatus 20, as shown in FIG. 2, includes a control portion 21, a storage portion 22, and a radio communication portion 23. The control portion 21 controls individual portions of the mobile station apparatus 20, and executes processing relating to a call and a data communication. The storage portion 22 operates as a work memory of the control portion 21. In addition, the storage portion 22 holds therein a program and parameters relating to various kinds of processing to be executed by the control portion 21, and stores therein a program as well relating to the present invention. The radio communication portion 23 includes an antenna and a wave detector. The radio communication portion 23 modulates an audio signal, a packet for a communication, and the like in accordance with an instruction inputted thereto from the control portion 21 and outputs the resulting signal through the antenna. Also, the radio communication portion 23 receives and demodulates an audio signal, a packet for a communication, and the like which arrive at the antenna and outputs the resulting signal to the control portion 21.

The radio communication portion 23 makes a communication by simultaneously using a plurality of links for one communication, i.e., through a plurality of base station apparatus 30 for one communication. When a plurality of links are used in such a manner, the control portion 21 determines rates of amounts of data to be transmitted through the respective links.

Figure 3:
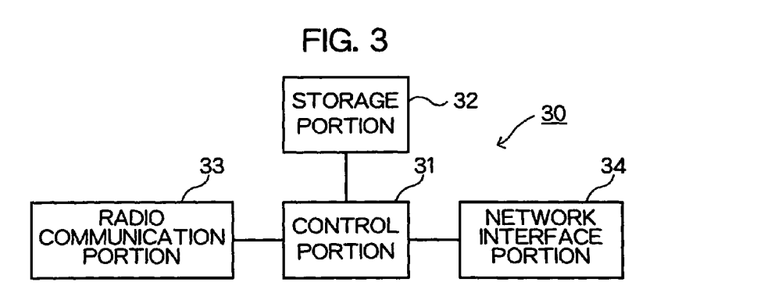
FIG. 3 is a block diagram showing a configuration of base station apparatus according to the embodiment of the present invention.

The base station apparatus 30, as shown in FIG. 3, includes a control portion 31, a storage portion 32, a radio communication portion 33, and a network interface portion 34. The control portion 31 controls individual portions of the base station apparatus 30 and executes processing relating to a call and a data communication. The storage portion 32 operates as a work memory of the control portion 31. In addition, the storage portion 32 holds therein a program and parameters relating to various kinds of processing to be executed by the control portion 31, and stores therein a program as well relating to the present invention. The radio communication portion 33 includes an antenna and a wave detector. The radio communication portion 33 receives and demodulates an audio signal, a packet for a communication, and the like from at least one mobile station apparatus 20, respectively, and outputs the resulting signal to the control portion 31. The radio communication portion 33 modulates an audio signal, a packet for a communication, and the like which are inputted from the control portion 31 in accordance with an instruction inputted thereto from the control portion 31, and outputs the resulting signal through the antenna. The network interface portion 34 is connected to a communication network (not shown). The network interface portion 34 receives an audio signal, a packet for a communication, and the like from the server apparatus 40 connected to the communication network and outputs the audio signal, the packet for a communication, and the like to the control portion 31. Also, the network interface portion 34 transmits the audio signal, the packet for a communication, and the like to the server apparatus 40 in accordance with an instruction issued from the control portion 31.

The base station apparatus 30 transmits a signal received from the mobile station apparatus 20 to the server apparatus 40, and transmits a signal received from the server apparatus 40 to the mobile station apparatus 20. In such a manner, the base station apparatus 30 serves as a relay communication apparatus for relaying a communication made between the mobile station apparatus 20 and the server apparatus 40.

Figure 4:
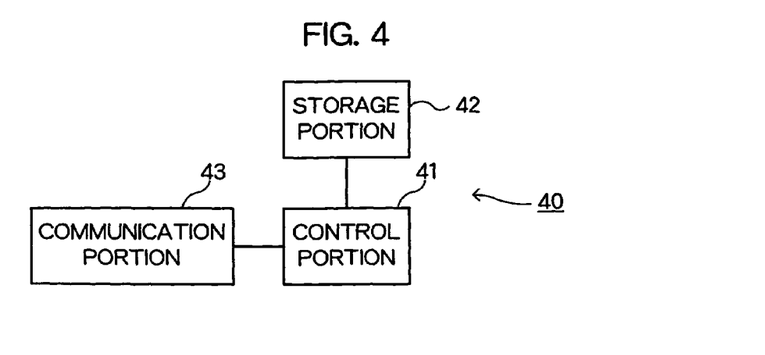
FIG. 4 is a block diagram showing a configuration of a server apparatus according to the embodiment of the present invention.

The server apparatus 40, as shown in FIG. 4, includes a control portion 41, a storage portion 42, and a communication portion 43. A computer such as an exchange, a personal computer, a work station, or a main frame is preferably used as the server apparatus 40. The control portion 41 controls individual portions of the server apparatus 40 and executes processing relating to a data communication and various kinds of information processing. In addition, the control portion 41 displays the results of the processing on display means (not shown). The control portion 41 receives an input signal from input means (not shown) and executes processing corresponding to the input signal. The storage portion 42 operates as a work memory of the control portion 41. In addition, the storage portion 42 holds therein a program and parameters relating to various kinds of processing to be executed by the control portion 41, and stores therein a program as well relating to the present invention. The communication portion 43 is connected to a communication network (not shown), and connected to a plurality of base station apparatus 30 through the communication network.

The communication portion 43 makes a communication by simultaneously using a plurality of links for one communication, i.e., through a plurality of base station apparatus 30. When a plurality of links are used in such a manner, the control portion 41 determines rates of amounts of data to be transmitted through the respective links.

As described above, the mobile station apparatus 20 and the server apparatus 40 in this embodiment make one communication with each other by simultaneously using a plurality of links. Incidentally, the communication system for making one communication by simultaneously using a plurality of links in such a manner is called a multilink communication.

In this embodiment, the base station apparatus 30 acquires information on an amount of data (an amount of transmittable data) which the mobile station apparatus 20 and the server apparatus 40 can transmit especially in a radio section of the links which the base station apparatus 30 relays, and informs the mobile station apparatus 20 or the server apparatus 40 of the information on the amount of data. The mobile station apparatus 20 or the server apparatus 40 distributes the transmission data to the respective links in correspondence to the amounts of transmittable data. Hereinafter, a constitution and processing relating to the processing, for distributing the transmission data to the respective links, which is executed in the server apparatus 40, and a constitution and processing relating to the processing, for distributing the transmission data to the respective links, which is executed in the mobile station apparatus 20 will be described as the first embodiment and the second embodiment, respectively.

The First Embodiment

Figure 5:
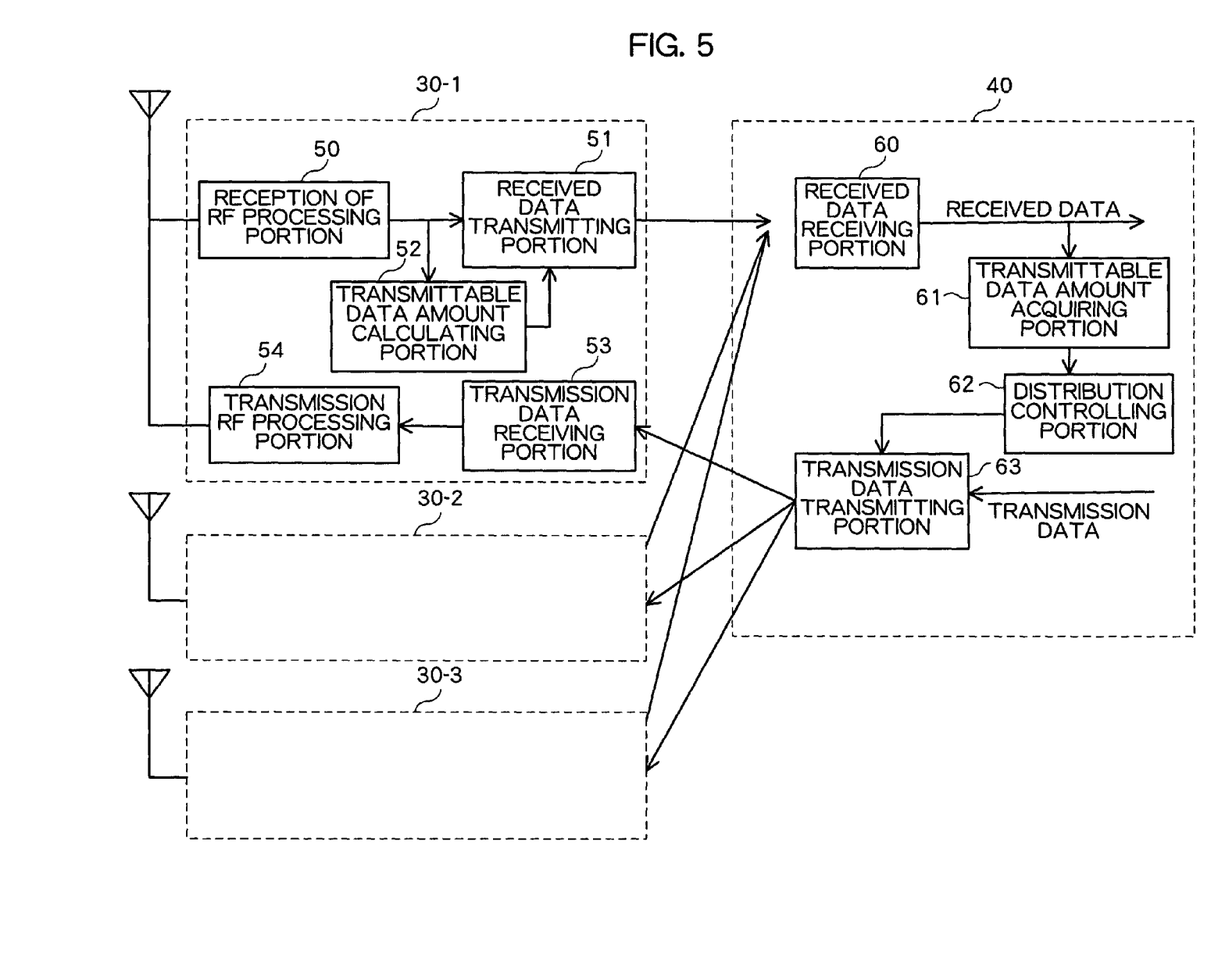
FIG. 5 is a functional block diagram showing configurations of the server apparatus and the base station apparatus according to the first embodiment of the present invention.

FIG. 5 is a functional block diagram showing configurations of the base station apparatus 30 and the server 40 according to the first embodiment of the present invention. Referring to FIG. 5, the base station apparatus 30 functionally includes a reception RF processing portion 50, a received data transmitting portion 51, a transmittable data amount calculating portion 52, a transmission data receiving portion 53, and a transmission RF processing portion 54. In addition, the server apparatus 40 functionally includes a received data receiving portion 60, a transmittable data amount acquiring portion 61, a distribution controlling portion 62, and a transmission data receiving portion 63.

The reception RF processing portion 50 receives a radio signal transmitted thereto from each of the mobile station apparatuses 20. Then, the reception RF processing portion 50 demodulates the received radio signal to acquire communication data, and transmits the communication data to the received data transmission portion 51. The received data transmission portion 51 transmits the inputted communication data to the server apparatus 40 corresponding to the links through which the mobile station apparatus 20 which has transmitted that communication data makes a communication.

The transmittable data amount calculating portion 52 acquires radio band information based on a radio signal (up radio signal), from each of the mobile station apparatuses 20, which is received by the reception RF processing portion 50. The radio band information is information representing a degree of communication margin in a radio section. More specifically, the radio band information represents the number of communications in the radio section, an error rate or a data rate in the radio section, etc. Next, the transmittable data amount calculating portion 52 calculates the amount of transmittable data based on the acquired radio band information. The amount of transmittable data means an amount of data (an amount of down transmittable data) which can be transmitted from the base station apparatus 30 to the mobile station apparatus 20. The details of processing for calculating amounts of transmittable data (processing for determining amounts of transmittable data) will be described later. The transmittable data amount calculating portion 52 outputs information on the amount of transmittable data calculated to the received data transmitting portion 51. The received data transmitting portion 51 transmits the inputted information on the amount of transmittable data to the server apparatus 40.

The received data receiving portion 60 receives the communication data transmitted from the base station apparatus 30 and outputs the communication data as received data to a communication processing portion (not shown). The transmittable data amount acquiring portion 61 acquires information on amounts of transmittable data contained in the communication data which is outputted to the communication processing portion by the received data receiving portion 60.

The distribution controlling portion 62 determines rates of distribution of the communication data to the respective links based on the amounts of transmittable data which the transmittable data amount acquiring portion 61 acquires. The distribution rates become criteria when the transmission data transmitting portion 63 distributes the communication data to the respective links. That is, the transmission data transmitting portion 63 transmits the communication data inputted thereto from the communication processing portion (not shown) to the respective links at the distribution rates determined by the distribution controlling portion 62.

The transmission data receiving portion 53 receives the communication data transmitted thereto in the manner as described above, and outputs the communication data to the transmission RF processing portion 54. The transmission RF processing portion 54 transmits the inputted communication data to the mobile station apparatus 20.

Hereinafter, a description will be given with respect to processing (processing for determining an amount of transmittable data) for calculating an amount of data which can be transmitted from the server apparatus 40 to the mobile station apparatus 20 through the corresponding base station apparatus 30 by the transmittable data amount calculating portion 52 in the mobile communication system 10 having such a construction with reference to processing flow charts shown in FIGS. 6 and 7.

Figure 6:
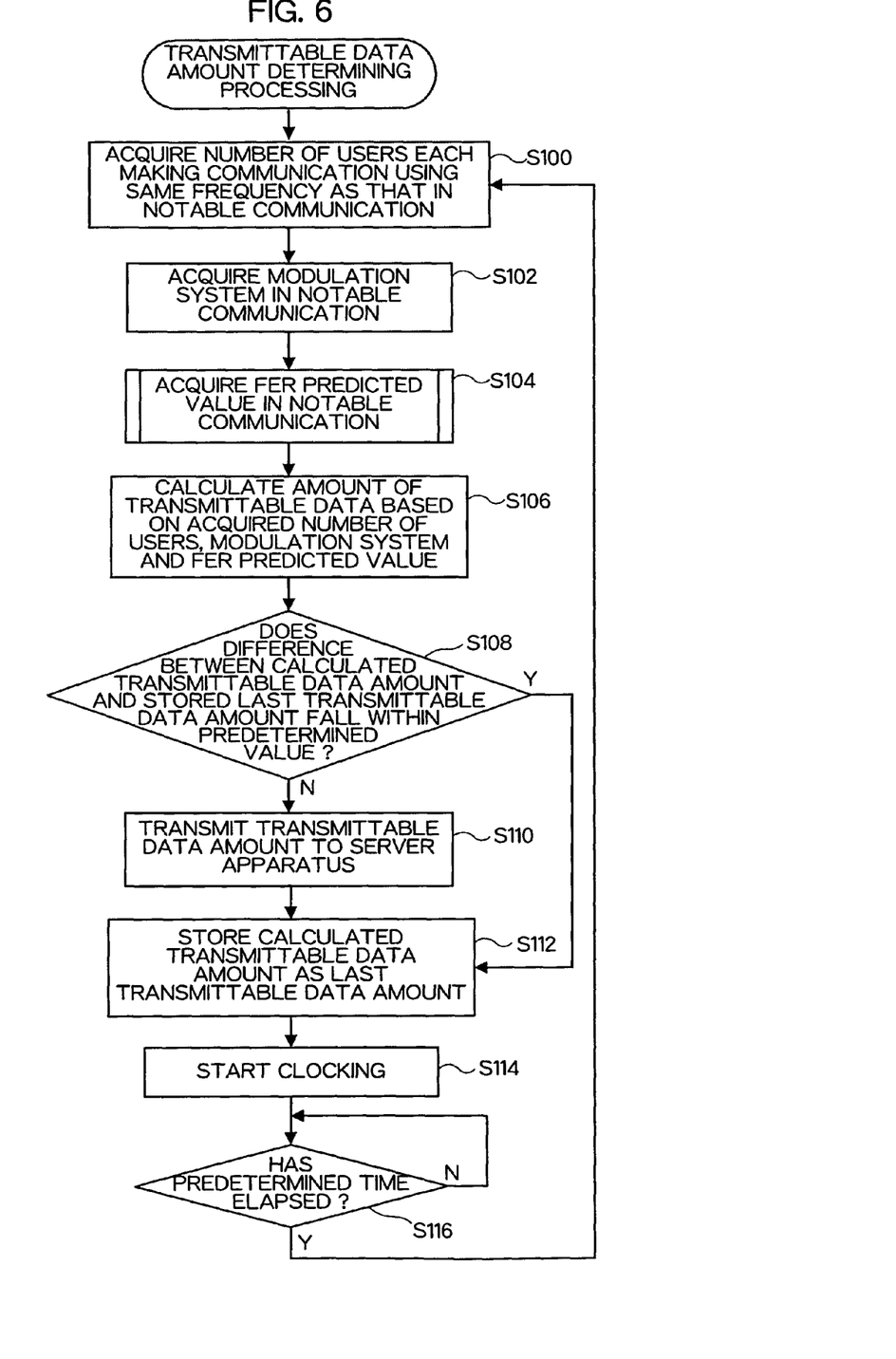
FIG. 6 is a processing flow chart according to the first embodiment of the present invention.

FIG. 6 is a flow chart explaining processing for determining an amount of transmittable data in the corresponding base station apparatus 30. In the processing shown in the figure, when a plurality of mobile station apparatuses 20 make the multilink communications with the server apparatus 40 by using a plurality of base station apparatus 30 as the relay communication apparatuses, respectively, each of base station apparatuses 30 pays attention to a communication which one mobile station apparatus 20 makes, and makes the communication an object of transmission data amount determining processing which will be executed from now on. Incidentally, each of base station apparatuses 30 successively pays attention to communications which the mobile station apparatuses 20 make, respectively, and executes the transmission data amount determining processing for each of those communications.

As shown in FIG. 6, firstly, each of base station apparatuses 30 acquires data on the number of users (the number of mobile station apparatuses 20) who are making respective communications by using the same frequency as that in a notable communication in the radio section (S100). "The number of mobile station apparatuses 20 each making a communication by using the same frequency as that in the notable communication" is one of the above-mentioned radio band information.

Next, each of base station apparatuses 30 acquires data on a modulation class in the notable communication (S102). For example, QPSK, 16QAM, etc. are known as the modulation class. When modulation is performed using QPSK, each of base station apparatuses 30 acquires data on QPSK. "The modulation class in the notable communication" is also one of the radio band information, and is information representing the data rate in the radio section.

Moreover, each of base station apparatuses 30 acquires a Frame Error Rate (FER) predicted value in the notable communication (S104) "The FER predicted value in the notable communication" is also one of the radio band information, and is information representing the error rate in the radio section. Hereinafter, processing for calculating an FER predicted value will be described in more detail with reference to FIG. 7. It should be noted that the processing for calculating an FER predicted value is executed in parallel with the transmittable data amount determining processing.

Figure 7:
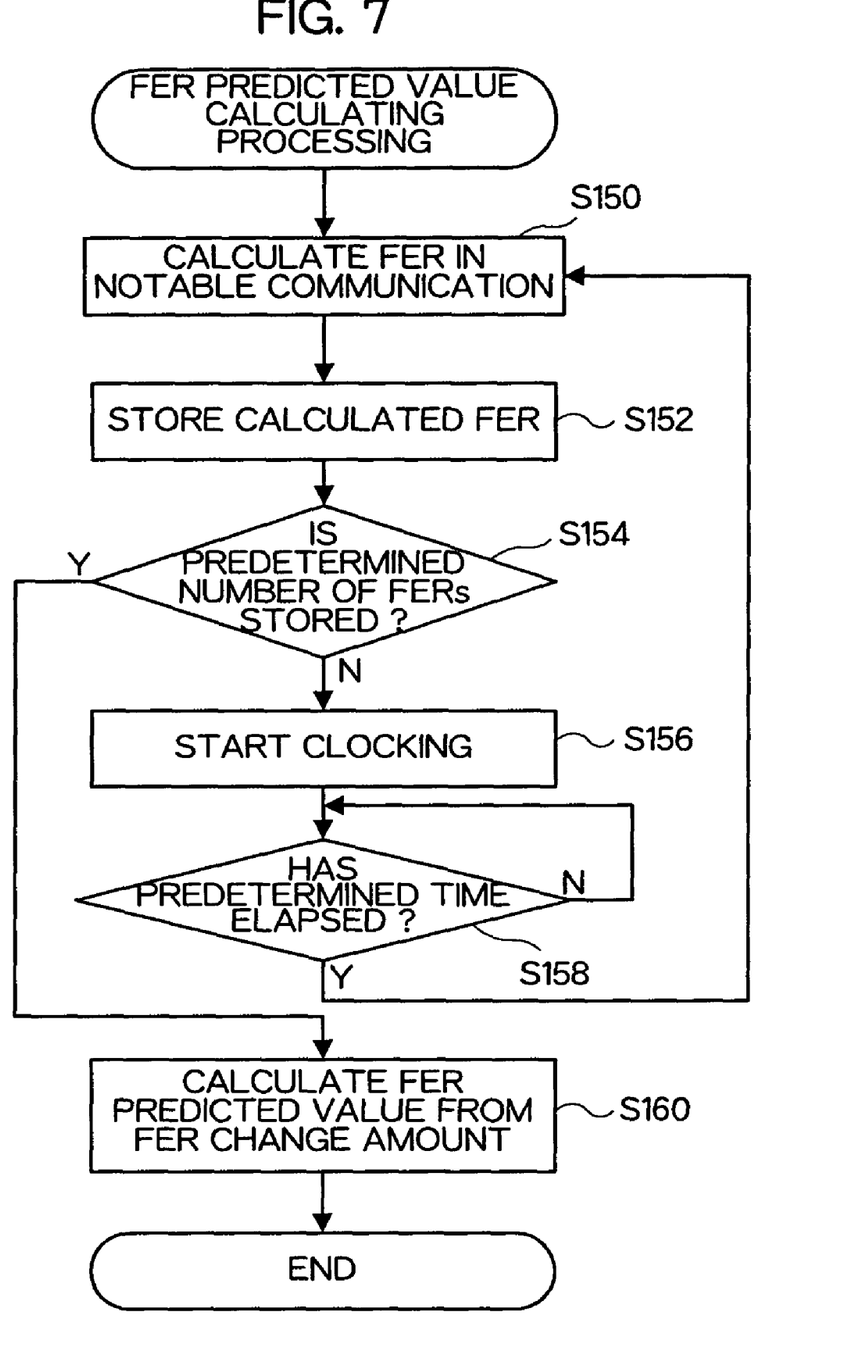
FIG. 7 is a processing flow chart according to the first embodiment of the present invention.

FIG. 7 is a flow chart explaining the processing for calculating an FER predicted value in the base station apparatus 30. As shown in the figure, each of base station apparatuses 30 calculates the FER in the notable communication (S150), and stores the calculated FER in the storage portion 32 (S152) Then, it is judged whether or not the number of FERs, in the notable communication, stored through this processing has reached a predetermined value (S154). When it is judged in S154 that the number of FERs has not yet reached the predetermined number, time is started to be measured (S156), and it is judged whether or not a predetermined time has elapsed (S158). When it is judged in S158 that the predetermined time has elapsed, the processing of S150 is started to be executed again. On the other hand, when the number of FERs has reached the predetermined value, processing for calculating the FER predicted value from a change amount of FER is executed (S160). More specifically, a time vs. FER curve showing a tendency of a change corresponding to a time of the FER is acquired by performing interpolation based on the least squares method or the like. Also, the FER (FER predicted value) at a prediction object time is acquired by applying the time of the prediction object time to that curve. Each of the base station apparatus 30 can acquire the FER predicted value in the manner as described above.

Next, each of base station apparatuses 30 calculates an amount of data (amount of down transmittable data), which can be transmitted through the notable communication, with respect to the radio section utilized through the notable communication based on at least one of the radio band information typified by "the number of mobile station apparatuses 20 each making a communication by using the same frequency as that in the notable communication", "the modulation class in the notable communication", and "the FER predicted value in the notable communication" which have all been acquired (S106). Hereinafter, the calculation processing will be described in detail.

Incidentally, in the following calculation processing, the base station apparatus 30 calculates the amount of transmittable data by applying the amount of transmittable data to any one of a plurality of stages (S stages from a stage 1 to a stage S in this case). That is, the base station apparatus 30 stores concrete values of the amounts of transmittable data in correspondence to the respective stages. The base station apparatus 30 firstly calculates the stage to which the amount of transmittable data belongs, and uses the concrete value made correspond to the calculated stage as the amount of transmittable data.

Firstly, a description will be given with respect to a case where the amount of transmittable data is calculated based on "the number of mobile station apparatuses 20 each making a communication by using the same frequency as that in the notable communication" (S100 and S106). When n is assigned to "the number of mobile station apparatuses 20 each making a communication by using the same frequency as that in the notable communication", the stage D to which the amount of transmittable data belongs can be determined in correspondence to "the number of mobile station apparatuses 20 each making a communication by using the same frequency as that in the notable communication" from Expression 1. Here, a notation [ ] is a Gauss' notation. When n≦X<n+1, this notation represents that a decimal fraction of X is rounded down to zero so as to obtain [X]=n.

$$D=[S/n] \qquad \text{(Expression 1)}$$

Next, a description will be given with respect to a case where the amount of transmittable data is calculated based on "the modulation class in the notable communication" (S102 and S106). When the data rate in "the modulation class in the notable communication" is assigned R and the maximum data rate is assigned $R_{max}$, the stage D to which the amount of transmittable data belongs can be determined in correspondence to "the modulation class in the notable communication" from Expression 2. The higher the data is, the more data can be transmitted. As a result, the amount of data to be transmitted can be increased as the data rate becomes higher.

$$D=[S \times R/R_{max}] \qquad \text{(Expression 2)}$$

Next, a description will be given with respect to a case where the amount of transmittable data is calculated based on "the FER predicted value in the notable communication" (S104 and S106). When "the FER predicted value in the notable communication" is assigned F, and the maximum FER at which the mobile station apparatus 20 can perform the demodulation is assigned $F_{max}$, the stage D to which the amount of transmittable data belongs can be determined in correspondence with "the FER predicted value in the notable communication" from Expression 3. The higher the FER is, a less data is transmitted. In this case, however, the amount of data to be transmitted can be reduced as the FER becomes higher.

$$D=[S \times (F_{max}-F)/F_{max}] \qquad \text{(Expression 3)}$$

Finally, a description will be given with respect to a case where the amount of transmittable data is calculated based on all "the number of mobile station apparatuses 20 each making a communication by using the same frequency as that in the mobile communication", "the modulation class in the mobile communication", and "the FER predicted value in the mobile communication" (S100, S102, S104, and S106). The same notation as that in the foregoing is used. In this case, the stage D to which the amount of transmittable data belongs can be determined from Expression 4:

$$D=[S/n \times (R/R_{max}) \times (F_{max}-F)/F_{max}] \qquad \text{(Expression 4)}$$

Each of the base station apparatus 30 compares the amount of transmittable data calculated in the manner as described above with the amount of last transmittable data the information on which is stored in the storage portion 32 prior to execution of processing of S112 (S108). When the comparison results show that a difference between the amount of transmittable data calculated and the amount of last transmittable data does not fall within a predetermined value, each of base station apparatuses 30 transmits transmittable data amount information representing the amount of transmittable data calculated to the server apparatus 40 (S100). On the other hand, when the comparison results show that the difference therebetween falls within the predetermined value, each of base station apparatuses 30 transmits no transmittable data amount information. Only when it becomes clear through the comparison processing that a change equal to or larger than the predetermined value occurs in the amount of transmittable data, the transmittable data amount information can be transmitted to the server apparatus 40. The information on the amount of transmittable data calculated is stored as information on the amount of last transmittable data in the storage portion 32 (S112). Incidentally, the transmittable data amount information representing the amount of transmittable data calculated may be transmitted to the server apparatus 40 unless a difference between the amount of transmittable data calculated and any one of a plurality of amounts of last transmittable data the information on which is stored falls within the predetermined value. As a result, even when the amount of transmittable data changes a little at a time, the information on the amount of transmittable data can be transmitted.

After the information on the amount of transmittable data is stored, time is started to be measured (S114). It is then judged whether or not a predetermined time has elapsed (S116). When so, the operation returns back to the processing of S100, and the processing for calculating the amount of transmittable data is repeatedly executed again.

From the foregoing, the server apparatus 40 can acquire the amount of transmittable data every communication and every link from each of base station apparatuses 30. Next, a description will be given with respect to processing for determining the distribution rate based on the amount of transmittable data for each link by the distribution controlling portion 62.

Figure 8:
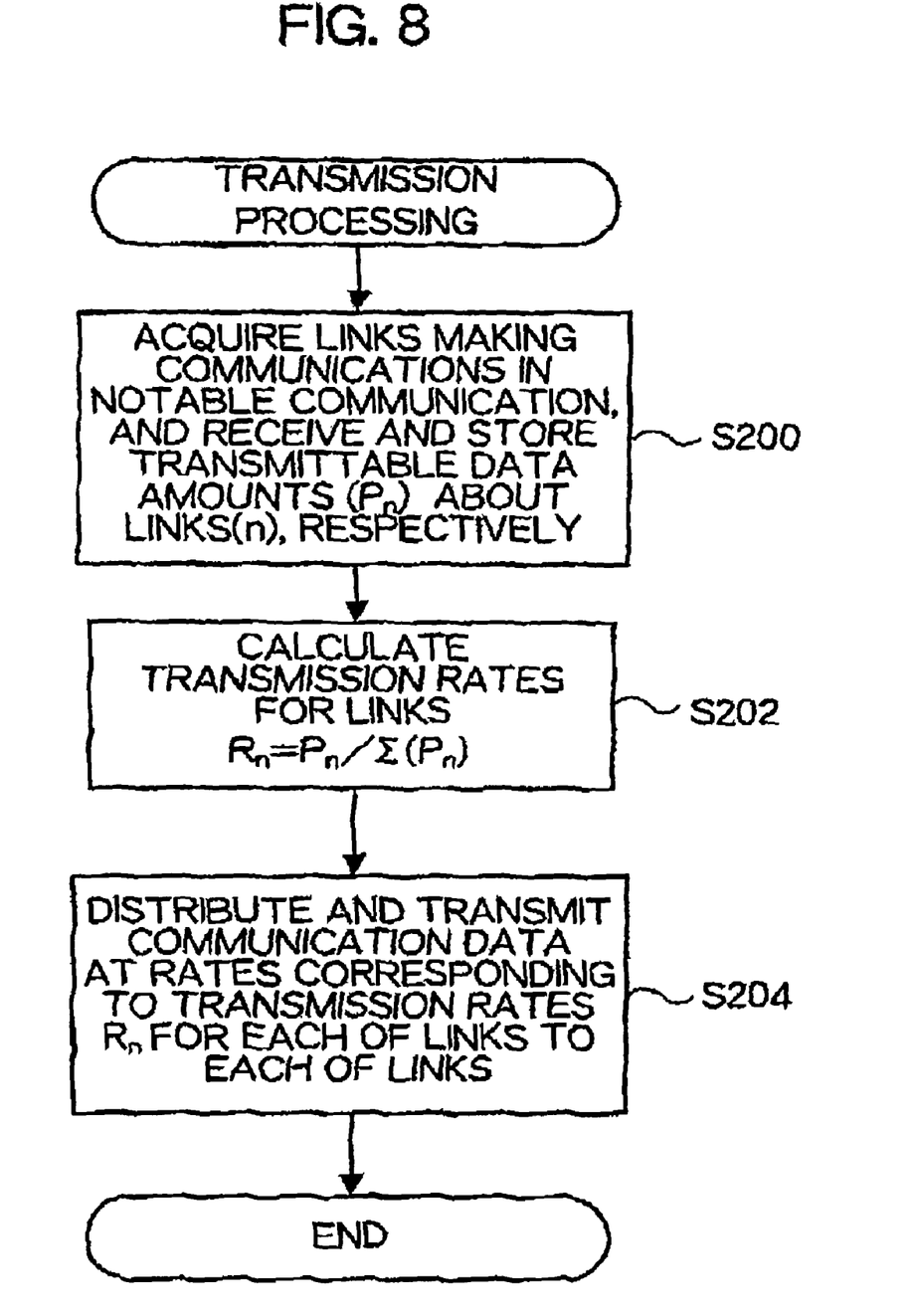
FIG. 8 is a processing flow chart according to the first embodiment of the present invention.

FIG. 8 is a processing flow chart showing a part of transmission processing when the server apparatus 40 transmits data to the mobile station apparatus 20 by using a plurality of links. The distribution controlling portion 62 firstly selects a notable communication from among a plurality of communications being made by the server apparatus 40 and acquires the links making communications (a plurality of links in an ordinary case) in the notable communication. The distribution controlling portion 62, with respect to the acquired links (the link number is expressed by n (n≧1)), receives transmittable data amount information (amount of transmittable data represented by the transmittable data amount information is expressed by $P_n$) which is transmitted from the base station apparatus 30 through the acquired links, and stores the transmittable data amount information in the storage portion 42

(S200). After receiving the transmittable data amount information from all the base station apparatus 30 through the links making communications in the notable communication, the distribution controlling portion 62 calculates a transmission rate (the distribution rate: expressed by $R_n$) for each link (S202). More specifically, preferably, the distribution rate is calculated from Expression 5:

$$R_n = P_n / \Sigma P_n \qquad \text{(Expression 5)}$$

where $\Sigma$ represents a total sum about n.

The server apparatus 40 distributes the communication data on the amounts of data of the respective rates corresponding to the transmission rates $R_n$ thus calculated for the respective links to the respective links, and transmits the communication data through the respective links (S204). As a result, the transmission becomes possible with the amount of data corresponding to the amount of down transmittable data for each communication and for each link.

Consequently, it becomes possible to suitably determine the amount of transmission data every link in the multilink communication. In addition, even when a plurality of communications are made, it becomes possible to suitably determine the amounts of transmission data for the respective links every communication. In other words, the amount of data to be transmitted from the server apparatus can be determined every communication and every link in correspondence to the amount of data, for each link, able to be transmitted from the base station apparatus to the mobile station apparatus, i.e., the amount of data able to be transmitted in the down radio section.

Second Embodiment

Figure 9:
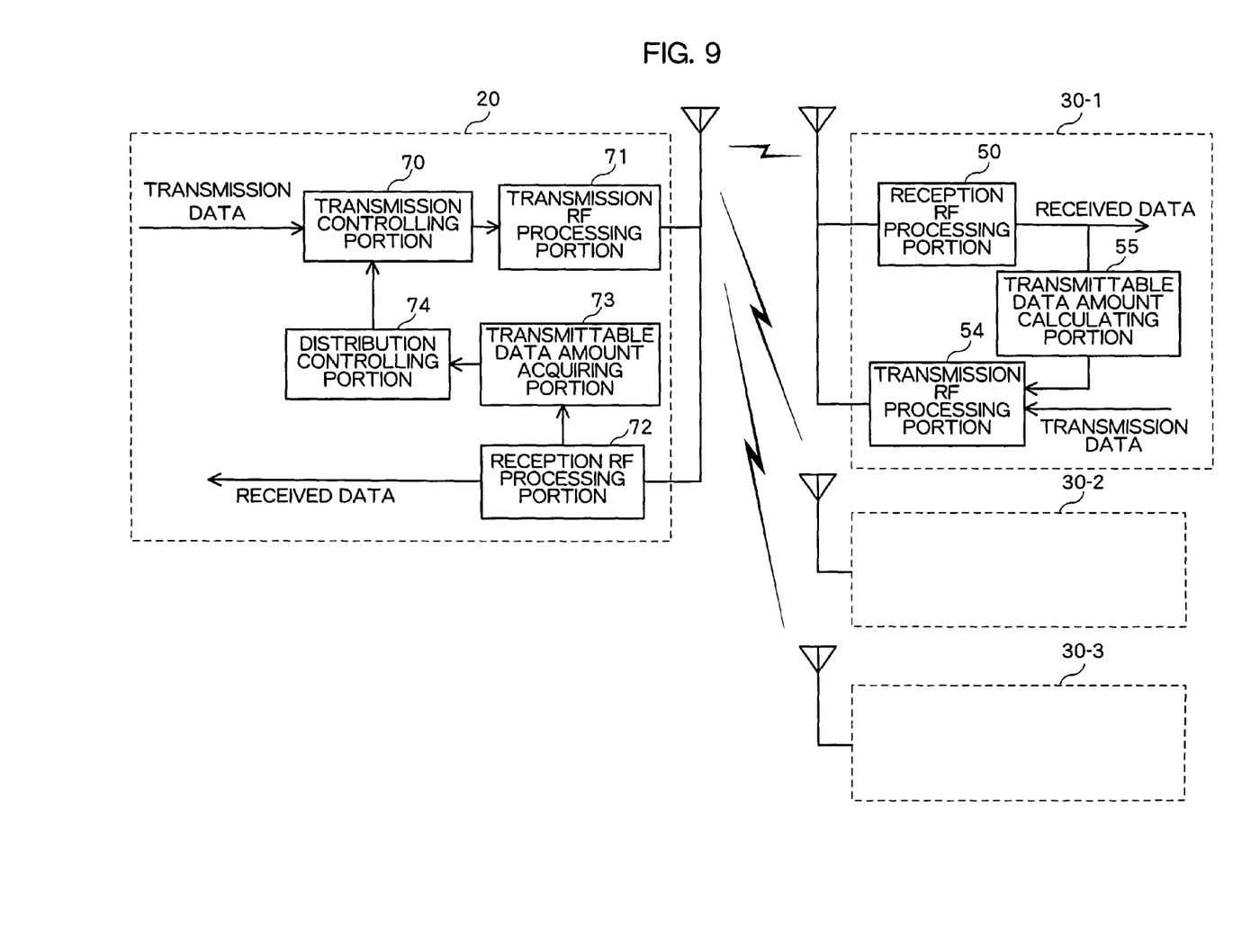
FIG. 9 is a functional block diagram showing configurations of the mobile station apparatus and the base station apparatus according to the second embodiment of the present invention.

FIG. 9 is a functional block diagram showing configurations of the mobile station apparatus 20 and the base station apparatus 30 according to the second embodiment of the present invention. Referring to FIG. 9, the base station apparatus 30 functionally includes a transmittable data amount calculating portion 55 in addition to the reception RF processing portion 50 and the transmission RF processing portion 54. In addition, the mobile station apparatus 29 functionally includes a transmission controlling portion 70, a transmission RF processing portion 71, a reception RF processing portion 72, a transmittable data amount acquiring portion 73, and a distribution controlling portion 74.

The transmittable data amount calculating portion 55 acquires radio band information based on a radio signal (up radio signal), from each of the mobile station apparatuses 20, received by the reception RF processing portion 50. The radio band information is information representing a degree of communication margin in a radio section. Concretely speaking, the radio band information represents the number of communications in the radio section, an error rate or a data rate in the radio section, etc. Next, the transmittable data amount calculating portion 55 calculates an amount of transmittable data based on the acquired radio band information. The processing for calculating an amount of transmittable data is similar in concrete contents to that executed in the transmittable data amount calculating portion 52. However, the amount of transmittable data in this case means an amount of data (amount of up transmittable data) which can be transmitted from the mobile station apparatus 20 to the base station apparatus 30.

The transmittable data amount calculating portion 55 outputs information on the amount of transmittable data calculated to the transmission RF processing portion 54. The transmission RF processing portion 54 transmits the inputted information on the amount of transmittable data to the mobile station apparatus 20.

The reception RF processing portion 72 receives communication data transmitted thereto from the base station apparatus 30 and outputs the received communication data as received data to a communication processing portion (not shown). The transmittable data amount acquiring portion 73 acquires information on the amounts of transmittable data contained in the communication data which is outputted to the communication processing portion (not shown) by the reception RF processing portion 72.

The distribution controlling portion 74 determines the rates of distribution of the communication data to the respective links based on the amounts of transmittable data the information on which the transmittable data amount acquiring portion 73 acquires. The distribution rates become criteria when the transmission controlling portion 70 distributes the communication data to the respective links. That is, the transmission controlling portion 70 determines the links through which the communication data inputted from the communication processing portion (not shown) is transmitted based on the distribution rates. The transmission controlling portion 70 make the communication data correspond to the respective links for transmitting the communication data, and outputs the transmission RF processing portion 71. The transmission RF processing portion 71 transmits the communication data to the links which are made correspond to the communication data.

Figure 10:
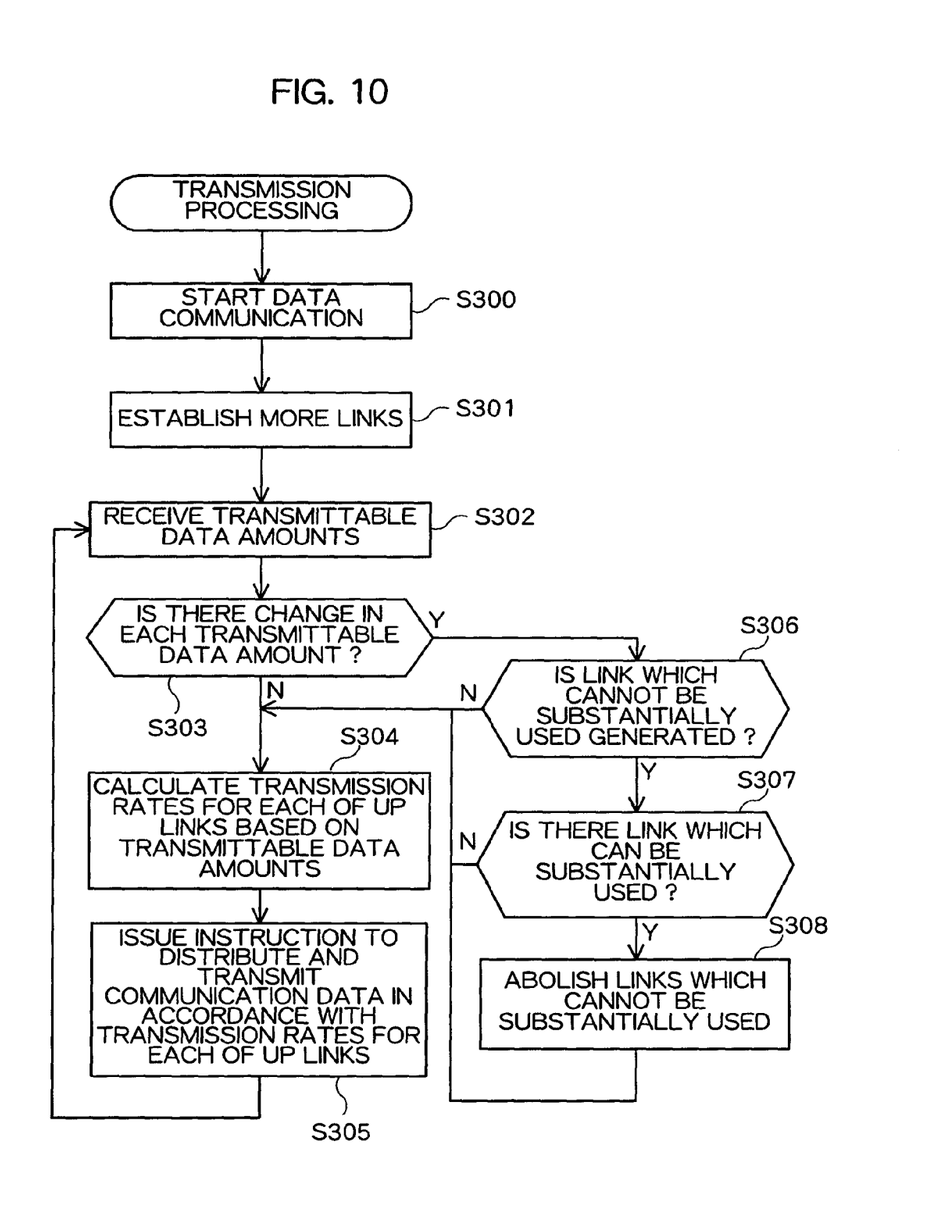
FIG. 10 is a processing flow chart according to the second embodiment of the present invention.

Hereinafter, a description will be given with respect to transmission processing for transmitting the communication data based on the amount of transmittable data for each link in the mobile communication system 10 having the construction as described above.

FIG. 10 is a processing flow chart showing a part of the transmission processing when the mobile station apparatus 20 transmits the data to the server apparatus 40 by using a plurality of links. As shown in the figure, firstly, the mobile station apparatus 20 starts to make a data communication with the server apparatus 40 (S300). When the multilink communication is intended to be made, more links are established (S301). The mobile station apparatus 20 implements multilink communication through this processing.

Next, the mobile station apparatus 20 receives transmittable data amount information from a plurality of base station apparatus 30 which relays the respective links (S302). At this time, the mobile station apparatus 20 stores information on the amount of transmittable data received from each of base station apparatuses 30. The mobile station apparatus 20 judges whether or not there is a change in amount of transmittable data received from each of base station apparatuses 30 by comparing the amount of transmittable data the information on which is formerly stored and the amount of transmittable data the information on which is received with each other (S303).

When judging in S303 that there is no change in amount of transmittable data, the mobile station apparatus 20 calculates the transmission rates $R_n$ for the respective links based on the received transmittable data amount information (S304). This transmission rate calculating processing is the same as that in the first embodiment described above with reference to FIG. 8. The mobile station apparatus 20 instructs the transmission controlling portion 70 to distribute and transmit the communication data the amount of which is the rates corresponding to the calculated transmission rates $R_n$ for the respective links to the respective links (S305)

On the other hand, when judging in S303 that there is a change in amount of transmittable data, the mobile station apparatus 20 judges whether or not there is the link is generated which cannot be substantially used (S306). More specifically, the mobile station apparatus 20 judges whether or not there is a link where the amount of transmittable data is smaller than a predetermined value. Then, the mobile station apparatus 20 judges that no data can be substantially transmitted through the link where the amount of transmittable data is smaller than the predetermined value.

Next, the mobile station apparatus 20 judges whether or not there is the link which can be substantially used (S307). More specifically, the mobile station apparatus 20 judges whether or not there is the link where the amount of transmittable data exceeds the predetermined value. When so, the mobile station apparatus 20 judges that there is the link which can be substantially used. In this case, the mobile station apparatus 20 abolishes the link which is judged to be unable to be substantially used (S308). On the other hand, when the mobile station apparatus 20 judges in S306 that no link is generated which cannot be substantially used, and when the mobile station apparatus 20 judges in S307 that there is no link which cannot be substantially used, the operation proceeds to the processing of S304 and the communication data is transmitted. The mobile station apparatus 20 repeatedly executes this kind of processing until the communication is completed which has started to be made in S300.

In this case as well, the mobile communication system can suitably determine the amount of up transmission data every link in the multilink communication. In other words, the amount of data which is transmitted from the mobile station apparatus can be determined every link in correspondence to the amount of data, for each link, which can be transmitted from the mobile station apparatus to the base station apparatus, i.e., the amount of data which can be transmitted in the up radio section.

It should be noted that the present invention is not limited to Embodiments 1 and 2 described above. For example, in Embodiments 1 and 2 described above, the base station apparatus 30 calculates the amounts of transmittable data. However, when the data on "the number of mobile station apparatuses 20 each making a communication by using the same frequency as that in the mobile communication" is not used, the mobile station apparatus 20 can calculate the amounts of transmittable data. Of course, if the data on "the number of mobile station apparatuses 20 each making a communication by using the same frequency as that in the mobile communication" is transmitted from the base station apparatus 30 to the mobile station apparatus 20, even when the data on "the number of mobile station apparatuses 20 each making a communication by using the same frequency as that in the mobile communication" is used, the mobile station apparatus 20 can calculate the amounts of transmittable data. Likewise, when the information on transmittable data amount calculation basic amounts such as "the number of mobile station apparatuses 20 each making a communication by using the same frequency as that in the mobile communication", "the modulation class in the notable communication", and "the FER predicted value in the notable communication" transmitted from the base station apparatus 30 to the server apparatus 40 or the mobile station apparatus 20, the amounts of transmittable data can be calculated in the server apparatus 40 or the mobile station apparatus 20 as well.

In addition, while in Embodiments 1 and 2 described above, each of base station apparatuses 30 acquires radio band information based on the up radio signal, each of base station apparatuses 30 may also acquire the radio band information based on the down radio signal. In particular, since in the first embodiment, the amounts of down transmittable data are calculated, if the radio band information is acquired based on the down radio signal, the amount of down transmittable data can be more exactly calculated.

In addition, the present invention can be applied to not only the mobile communication system, but also all communication systems each of which makes a multilink communication.

While there have been described what are at present considered to be preferred embodiments of the invention, it will be understood that various modifications may be made thereto, and it is intended that the appended claims cover all such modifications as fall within the true spirit and scope of the invention.

Further, the disclosure of Japanese Patent Application Nos. 2004-281927 filed on Sep. 28, 2004, and Japanese Patent Application Nos. 2005-190639 filed on Jun. 29, 2005, including specification, claims, drawings and abstract is incorporated herein by reference in its entirety.

What is claimed is:

1. A communication system in which a first communication apparatus and a second communication apparatus make a multilink communication by simultaneously using a plurality of links, each of the links partially includes a radio link, wherein
each of said links is a link through which data is relayed by each of a plurality of relay communication apparatuses,
each of said relay communication apparatuses comprising:
transmittable data amount information determining means for determining transmittable data amount information representing an amount of data able to be transmitted from the first communication apparatus to the second communication apparatus through the link relayed by said relay communication apparatus; and
transmittable data amount information transmitting means for transmitting the transmittable data amount information to said first communication apparatus, and
said first communication apparatus comprising:
transmittable data amount information receiving means for receiving the transmittable data amount information transmitted thereto;
distribution rate determining means for determining rates of distribution of communication data to the respective links, based on amounts of transmittable data represented by the transmittable data amount information relative to a sum of the amounts; and
communication data transmitting means for transmitting communication data of amounts corresponding to the determined rates of distribution each of said links, wherein
the radio link is a part between each of the relay communication apparatuses and the second communication apparatus in each of the links, and
the transmittable data amount information is information representing amounts of data able to be transmitted through the radio link from each of the relay communication apparatuses to the second communication apparatus.

2. A communication system according to claim 1, wherein the transmittable data amount information is determined in correspondence to the number of communications using the same frequency as that of the radio link.

3. A communication system according to claim 1, wherein the transmittable data amount information is determined in correspondence to an error rate in the radio link.

4. A communication system according to claim 1, wherein the transmittable data amount information is determined in correspondence to a data rate in the radio link.

5. A communication system according to claim 1, wherein
the radio link is a part between each of the relay communication apparatuses and the first communication apparatus in each of the links, and
the transmittable data amount information is information representing amounts of data able to be transmitted through the radio link from the first communication apparatus to each of the relay communication apparatuses.

* * * * *